United States Patent
Linszner

(10) Patent No.: US 9,807,085 B2
(45) Date of Patent: Oct. 31, 2017

(54) SYSTEMS AND METHODS FOR AUTOMATED DETECTION OF LOGIN SEQUENCE FOR WEB FORM-BASED AUTHENTICATION

(71) Applicant: Veracode, Inc., Burlington, MA (US)

(72) Inventor: Daniel Linszner, Burlington, MA (US)

(73) Assignee: Veracode, Inc., Burlington, MA (US)

( * ) Notice: Subject to any disclaimer, the term of this patent is extended or adjusted under 35 U.S.C. 154(b) by 200 days.

(21) Appl. No.: 14/213,388

(22) Filed: Mar. 14, 2014

(65) Prior Publication Data

US 2014/0282975 A1 Sep. 18, 2014

Related U.S. Application Data

(60) Provisional application No. 61/791,308, filed on Mar. 15, 2013.

(51) Int. Cl.
*H04L 29/06* (2006.01)
*H04L 29/08* (2006.01)

(52) U.S. Cl.
CPC ............ *H04L 63/083* (2013.01); *H04L 67/02* (2013.01)

(58) Field of Classification Search
CPC ........ H04L 63/083; H04L 67/02; H04L 63/08; G06F 21/31
USPC ............................................................ 726/7
See application file for complete search history.

(56) References Cited

U.S. PATENT DOCUMENTS 8,543,986 B2 * 9/2013 Murthy et al. ............... 717/126
2014/0189808 A1 * 7/2014 Mahaffey et al. ............... 726/4

* cited by examiner

*Primary Examiner* — Mahfuzur Rahman
*Assistant Examiner* — Narciso Victoria
(74) *Attorney, Agent, or Firm* — Goodwin Procter LLP

(57) ABSTRACT

A system for automating login can determine if a web artifact, such as a web page, includes a login form, by identifying a password field, a user ID field, and a submit button or another element providing the functionality to submit credentials for authorization. Submission of user credentials may be emulated, and access to password protected areas can be ascertained, e.g., by identifying any element that permits signing out from the password protected area.

20 Claims, 2 Drawing Sheets

US 9,807,085 B2

SYSTEMS AND METHODS FOR AUTOMATED DETECTION OF LOGIN SEQUENCE FOR WEB FORM-BASED AUTHENTICATION

CROSS-REFERENCE TO RELATED APPLICATIONS

This application claims benefit of priority to U.S. Provisional Patent Application No. 61/791,308, entitled "Systems and Methods for Automated Detection of Login Sequence for Web Form based Authentication," filed on Mar. 15, 2013, the disclosure of which is incorporated herein by reference in its entirety.

FIELD OF THE INVENTION

The present invention generally relates to analysis of web artifacts and, in particular, to model based analysis of such artifacts.

BACKGROUND

The number of computer applications used by large corporations has increased significantly over the past thirty years. For example, companies may employ separate applications for electronic mail, document control, financial applications, inventory management, manufacturing control and engineering functions, in addition to overall network access. Each application often requires a separate login sequence or procedure (including some form of personal identification such as a user ID, a password, a key sequence or biometric authentication) and other routine responses to screens, forms and messages during the authentication and/or operation of the application.

A typical approach to automating a login sequence is for a person to monitor and manually record a login sequence a user may input into web-based forms as a macro, and play the login sequence back either through a browser or directly at the HTTP layer on a client device. Many public-facing websites use this type of forms-based authentication. With such record-and-playback browser methods, however, there is generally no standardized process for forms-based web authentication, and manual intervention by the user and/or another person is required to determine the login sequence.

Some techniques describe software intervening the web browser and the network, that tries to discern a set of HTTP exchanges that are related to authentication. At some point, the software can re-issue this set of exchanges to extend the session. Such software operates at the HTTP layer and, like the above described techniques, requires some person to manually login to the website while the software is listening to the exchanges at the HTTP layer, in order to determine the login sequence. Another technique, on the other hand, compares the web server's response with an already-known set of login macros/forms and fills in user credentials appropriately. This approach requires a priori knowledge of the login form because the response must be compared to a previously validated form, in order to automate the login. Therefore, this approach cannot determine a login sequence on-the-fly. In summary, various previously known techniques do not determine a login sequence without requiring manual intervention and/or prior knowledge of the login form.

The foregoing examples of the related art and limitations related therewith are intended to be illustrative and not exclusive. Other limitations of the related art will become apparent upon a reading of the specification and a study of the drawings. Improved systems and methods are therefore needed for login sequence automation.

SUMMARY

Various embodiments feature automatic login sequence determination without substantial human intervention and without any a priori knowledge of the login form. This is achieved, in part, by analyzing a structural model of a web artifact (e.g., a webpage or a web application), and/or events associated with the structural model. The login sequence can be determined by a processor by identifying in the model a form that has elements of types expected in a typical login form. Once determined, the processor can also validate the login sequence using credential supplied by the user. This analysis does not depend on any observation of the login sequence, performed manually and/or at the HTTP or other layers, and/or any a priori knowledge of the corresponding login form. As such, a login sequence can be determined, verified, and/or executed by a computing device, on the fly, i.e., without prior knowledge of the artifact and without significant human participation.

Accordingly, in one aspect, a method for determining a login sequence includes receiving in memory coupled to a processor a model of a web artifact. The model includes a structure of the web artifact and/or one or more events associated with one or more element of the structure. The method includes identifying by the processor, a password field in the model, a form associated with the password field, and one or more input fields in the form. The method also includes ascertaining by the processor that a number of input fields in the form equals a specified number of input fields. In addition, the method includes identifying by the processor a submit element in the form.

The web artifact may include a web page and/or a web application. The structure may include a document object model (DOM) of the web artifact, and one of the events from the several events may include a JavaScript event. In some embodiments, identifying one or more input fields includes identifying an input field of one or more of: (i) an unspecified type, (ii) a text type, and (iii) an email type. In manual operation, users typically provide credentials such as a login ID, user name, email address, etc., to such an input field.

In some embodiments, the specified number of input fields is one, i.e., only one input field in addition to the password field is expected to be present in the form. Identifying the submit element may include identifying one or more of an input field, an element of type button, an element associated with an onclick event, and a link. In some embodiments, the web artifact includes a webpage and the model includes a number of iframes associated with the webpage. Identifying a password field in the model may include identifying a password field in one or more iframes.

In some embodiments, the method further includes executing by the processor at least one click on a non-login artifact to retrieve the web artifact. The method may also include generating a login script by outputting by the processor one or more first commands. Each first command may correspond to a different one of the identified input fields. The processor may also output a second command, corresponding to the password field, and a third command, corresponding to the submit element. Each one of the first commands and the second command may include at least a portion of user credentials stored in the memory. The user credentials may include a user name and a corresponding password.

In some embodiments, the method further includes supplying user credentials stored in the memory to the web artifact, and verifying the web artifact using a first non-login artifact received in response to the supplied user credentials. For example, the processor may emulate entering user credentials at a login page and, in response, may gain access to a new page that is not a login page. Typically, the non-login page permits the user to exit the password protected area by clicking a "sign out" button or link. Therefore, verifying the authorization may include storing in the memory an access handle to the first non-login artifact, and testing if the first non-login artifact includes a sign-out element. The access handle may include a URL. The sign-out element may include a field, a button, and/or a link, associated with one or more of the following strings: "signout," "sign out," "logout," "log out," "my profile," "your profile," "edit profile," "my account," "your account," "edit account," "my settings," "your settings," "edit settings," and "account settings."

In some embodiments, the method includes seeking by the processor access to the stored access handle and, in response, receiving a second non-login artifact. If access to the stored access handle (e.g., the URL corresponding to a genuine password protected page) is sought without supplying the user credentials, the access would be denied and as such, any log out element would not be found to be associated with the second non-login artifact. As such, the method may include testing by the processor that the second non-login artifact lacks any sign out elements.

In some embodiments, the method includes generating a verification script by outputting by the processor a command to seek the stored access handle, and at least one command testing a lack of a particular sign-out element.

In another aspect, a system for determining a login sequence includes a memory and a processor. A model of a web artifact is stored in the memory. The model includes a structure of the web artifact and/or one or more events associated with an element of the structure. The processor is coupled to the memory and is configured to identify a password field in the model and a form associated with the password field. The processor is also configured to identify one or more input fields in the form, and ascertain that a number of input fields in the form equals a specified number of input fields. Moreover, the processor is configured to identify a submit element in the form.

In some embodiments, the processor is further configured to generate one or more first commands, such that each first command corresponds to a different one of the identified input fields. The processor is also configured to generate a second command corresponding to the password field, and a third command corresponding to the submit element. In addition, the processor may be configured to output a login script that includes the one or more first commands, the second command, and the third command.

In some embodiments, the processor is further configured to supply user credentials stored in the memory to the web artifact, and to verify the web artifact using a first non-login artifact received in response to the supplied user credentials. The processor may be configured to output a verification script if the verification is successful.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals generally refer to the same or similar elements. In different drawings, the same or similar elements may be referenced using different reference numerals. The drawings are not necessarily to scale, emphasis instead being placed upon illustrating aspects of the invention. In the drawings.

DETAILED DESCRIPTION OF EMBODIMENTS

The approach is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

A new approach is proposed that contemplates systems and methods to automate the creation of a valid login sequence for form-based authentication of users accessing a web site or application. Such an approach is able to determine the login sequence without any a priori knowledge of the Web site o application being accessed. The approach automates the login process to the web site or application that would otherwise require manual user actions to complete. Since a user no longer needs to attempt to create his/her own login sequence to access the web site or application, the approach saves the customers a lot of time and manual resources.

In general, this approach can be operated by any service that intends to log into web sites and/or applications on clients' behalf, such as password management services (e.g. Password1) and financial aggregation tools (e.g. Yodlee, Mint), which would be able to add support for new web sites much more quickly than by manually recording login macros.

Figure 1:
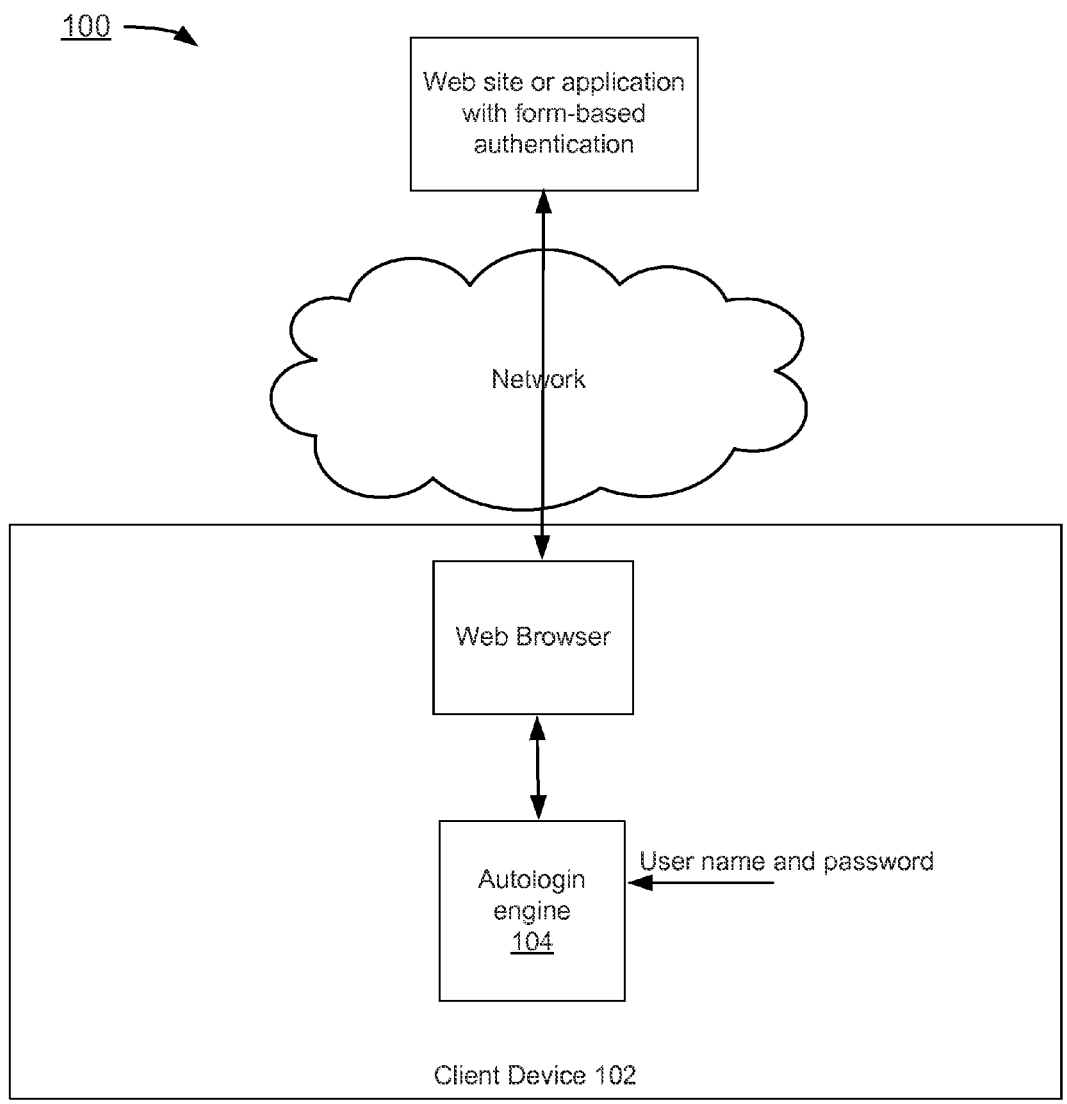
FIG. 1 depicts an example of a system diagram to support automated detection of login sequence for web form-based authentication.

FIG. 1 depicts an example of a system diagram to support automated detection of login sequence for web form-based authentication. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes at least a client device 102 and an autologin engine 104. As used herein, the term engine refers to software, firmware, hardware, or other component that is used to effectuate a purpose. The engine will typically include software instructions that are stored in non-volatile memory (also referred to as secondary memory). When the software instructions are executed, at least a subset of the software instructions is loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

In the example of FIG. 1, each of the engines can run on one or more hosting devices (hosts). Here, a host can be a computing device, a communication device, a storage device, or any electronic device capable of running a software component. For non-limiting examples, a computing device can be but is not limited to a laptop PC, a desktop PC, a tablet PC, an iPod, an iPhone, an iPad, Google's Android device, a PDA, or a server machine. A storage device can be but is not limited to a hard disk drive, a flash memory drive, or any portable storage device. A communication device can be but is not limited to a mobile phone.

In the example of FIG. 1, each of the engines has a communication interface (not shown), which is a software component that enables the engines to communicate with each other following certain communication protocols, such as TCP/IP protocol, over one or more communication networks (not shown). Here, the communication networks can be but are not limited to, internet, intranet, wide area network (WAN), local area network (LAN), wireless network, Bluetooth, WiFi, and mobile communication network. The physical connections of the network and the communication protocols are well known to those of skill in the art.

In the example of FIG. 1, a user located at a client device 102 connected to a network attempts to gain access to and use web site or application residing on the application server via a web browser. The applications residing on the application server can provide various services, including, by way of example only, network access, accounting services, software development services, on-line transaction processing services, document processing services, as well as others.

To gain access to the desired application(s), the user generally is required to provide some form of a user authentication credential as a login sequence for web form-based authentication. User authentication credentials are typically classified into one of three categories—something a user knows (e.g., a password), something a user has (e.g., a token or smartcard), and something a user is (e.g., a biometric credential such as a fingerprint, retinal scan, facial scan, voiceprint, DNA sequence, or the like). During the user authentication process, and once access is granted, the applications present to the user various forms, input fields, and buttons as screen objects that the user manipulates (by, for example, completing a text field, clicking on a button, navigating to a particular web page) to effectuate some desired action in the application. Many of these actions are repetitive in nature (e.g., they are done each time a user logs in or performs a particular function) and often use the same data for each occurrence.

In the example of FIG. 1, the autologin engine 104 automatically generates the login sequence the user enters through the web browser for form-based authentication. Specifically, the autologin engine 104 controls the operations of the web browser, obtaining full access to a model (e.g., Document Object Model (DOM) and/or Javascript Events) underlying an artifact to such as a web page or a web application. Once the model, generally referred to as DOM, is loaded in memory, the login sequence engine 104 searches the DOM and/or the Javascript events for common elements of the login forms, and deduces which are most likely to provide a valid login sequence, starting with the Password field.

In various embodiments, the entire DOM is searched for an input field of type password, e.g., a field specified as <input . . . type="password" . . . >. If such a field is found, a form corresponding to that field is identified. A search for at least one and optionally more additional input fields of unspecified and/or specified types such as text, email etc. in the identified form is then performed. One of these fields may correspond to a field in which a user may provide login ID such as user name, user's email address, etc. In the password field, the user typically enters the user's password.

A login form typically includes only three fields, namely: user ID field, password field, and a field permitting the user to submit the supplied information for authorization, such as a "login" button, a "submit" button, etc. In some instances, however, the login form may permit and/or require additional user credentials, such as a billing record number, user type, etc. As such, if more than one additional input fields are identified in the form, it may be verified that the number of any additional input fields detected is equal to a number specified by the user in the user's authorization credentials.

In addition to identifying the password field and one or more additional input fields, the form is searched to identify a "submit button." The submit button can be an input element of type "submit" or "button," an "image" element, or a "button" element. Therefore, the form may be searched for such elements, and if a word or string such as "log in," "login," "submit," etc. is found to be associated with any such element, that element can be identified as the "submit button."

In some embodiments, instead of using an input field or button for the submit operation, the form may include an element associated with a mouse, keyboard, or other event such as onclick event, onkeypress event, etc., to provide the submit credentials functionality. The form may also employ an object element that includes a class that can provide the submit functionality. As such, a search for this types of elements, i.e., an element associated with the onclick event, and classes associated with object elements can be performed to identify the element providing the submit functionality. Typically, a search for input and button elements is performed first and, if that search fails, the other types of elements, as described above, are searched.

If a login form is not found, the above described process may be repeated for each iframe on the current artifact (e.g., a web page). If a login in form is still not found, the autologin engine 104 may try to force a login form to appear by exercising other links/events, such as by clicking "Login," "Sign in," "Log in," etc., links. The clicking operation is emulated in that it is performed by a processor configured to do so, without any human intervention. This can be achieved, for example, by issuing commands such as "verifyElementPresent("link=regexpi:sign in")," "verifyElementPresent("link=regexpi:signin")," "verifyElementPresent("link=regexpi:signin")," and "verifyElementPresent ("link=regexpi:login")." The emulation may change the model and/or iframes associated with the current artifact (e.g., a web page) or may load a new page. The changed model, a model associated with a changed iframe, or a model associated with a new artifact may be analyzed, as described above, to search for a login form and login sequence.

Once a login sequence is determined, that sequence may be output and stored as a login script. In one embodiment, the output includes a "type" command corresponding to the identified input field corresponding to the user ID (e.g., user name, email address, etc.), and a "type" command corresponding to the password field. Each of these commands may include the corresponding user-supplied credentials such as the user's name and password. The output also includes a "clickAndWait" or "click" command associated with the identified submit button.

In some embodiments, the autologin engine 104 verifies that the login sequence is correct. To this end, a previously recorded/stored log in script is replayed in a new session, using the user supplied credentials. As such, the user's manual entry of the credentials and clicking of the submit button are emulated, and access may be gained to a website or web application. Typically, when access is granted, a new artifact, e.g., a new web page is presented. An access handle corresponding to the newly presented artifact (e.g., the new webpage) may then be stored. The access handle is typically the URL of a web page.

If the new artifact (e.g., webpage) is, in fact, password protected and was accessed by emulating an authorized user, it is likely that the new artifact includes an element allowing the user to terminate the authorized session, e.g., by signing out. As such a search for text such as "signout," "sign out," "logout," "log out," "my profile," "your profile," "edit profile," "my account," "your account," "edit account," "my settings," "your settings," "edit settings," and "account settings" is performed. This can be achieved, for example, using a command such as verifyTextPresent("regexpi:sign out")). If any such text is found, the emulated login attempt is determined to be successful.

In some embodiments, a further verification check is performed as follows. Access to the artifact corresponding to the stored handle is emulated, without using the user's credentials. If the handle corresponds to an actual password protected artifact that was previously accessed when user's credentials were used in the emulation, seeking access to that artifact (e.g., web page, web application, etc.), without the user's credentials, the access would fail. Instead, such emulation would load a different artifact indicating an error, or may load the login page (artifact, in general). As such, the element enabling the user to terminate the password-protected access is not likely present on this last loaded artifact. As, such the verification process tests the loaded artifact to ensure that any element representing sign out that was previously identified, or any other such element, is not present in the loaded artifact. If the verification is successful, a verification script including the emulation and testing commands may be generated and stored.

Unlike prior approaches, the autologin engine 104 is able to determine the login sequence automatically on-the-fly, rather than comparing the information collected against previously validated forms. In addition, the autologin engine 104 operates on level of the Web browser rather than its underlying HTTP layer.

Figure 2:
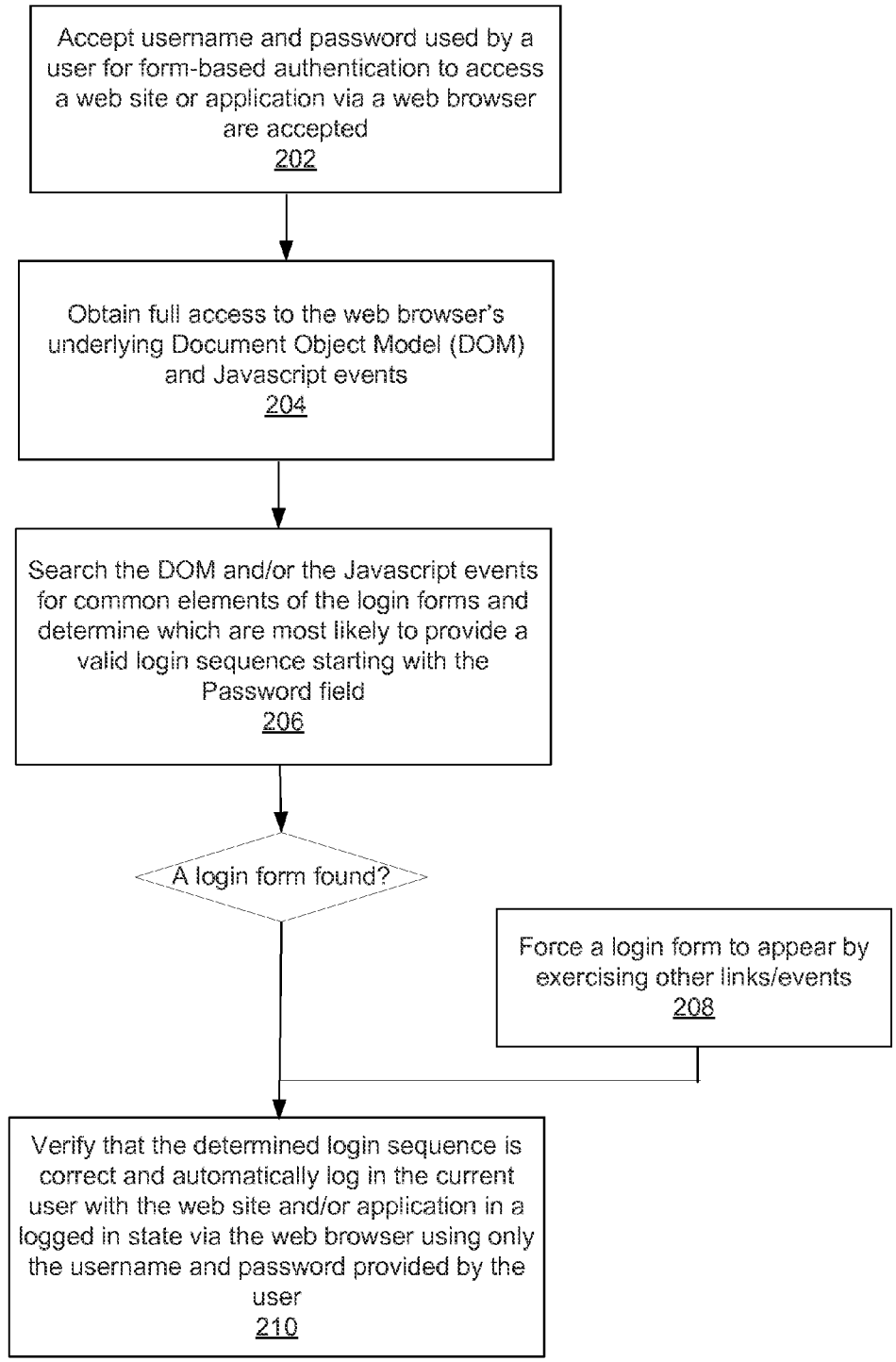
FIG. 2 depicts an example of a flowchart of a process to support automated detection of login sequence for web form-based authentication.

FIG. 2 depicts an example of a flowchart of a process to support automated detection of login sequence for web form-based authentication. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 2, the flowchart 200 starts at block 202 where username and password used by a user for form-based authentication to access a web site or application via a web browser are accepted. The flowchart 200 continues to block 204 where full access to the web browser's underlying Document Object Model (DOM) and Javascript events is obtained. The flowchart 200 continues to block 206 where the DOM and/or the Javascript events are searched for common elements of the login forms and which are most likely to provide a valid login sequence are deduced starting with the Password field. If a login form is not found at block 206, the flowchart 200 optionally continues to block 208 where a login form is forced to appear by exercising other links/events. The flowchart 200 ends at block 210 where the determined login sequence is verified to be correct and the current user is automatically logged in with the web site and/or application in a logged in state via the web browser, using only the username and password provided by the user.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more hosts to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human viewer or other mechanism utilizing the results of the present invention. Such software may include, but is not limited to, device drivers, operating systems, execution environments/containers, and applications.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "component" is used in the embodiments of the systems and methods described above, it will be evident that such concept can be interchangeably used with equivalent concepts such as, class, method, type, interface, module, object model, and other suitable concepts. Embodiments were chosen and described in order to best describe the principles of the invention and its practical application, thereby enabling others skilled in the relevant art to understand the claimed subject matter, the various embodiments and with various modifications that are suited to the particular use contemplated.

While the invention has been particularly shown and described with reference to specific embodiments, it will be understood by those skilled in the art that various changes in form and detail may be made therein without departing from the spirit and scope of the invention as defined by the appended claims. The scope of the invention is thus indicated by the appended claims and all changes that come within the meaning and range of equivalency of the claims are therefore intended to be embraced.

What is claimed is:

1. A method for determining a login sequence, the method comprising:
   (a) receiving in memory coupled to a processor of a client device, a model of a web artifact, the model comprising at least one of: (i) a structure of the web artifact, and (ii) one or more events associated with an element of the structure, the processor of the client device being different from another processor transmitting the web artifact;
   (b) identifying by the processor of the client device, a password field in the model, and a form associated with the password field, the form comprising a set of distinct input fields, each distinct input field having a respective type selected from a group consisting of: (i) an unspecified type, (ii) a text type, and (iii) an email type, one field in the set being the identified password field;
   (c) determining by the processor of the client device a total number of distinct input fields in the form, the determined total number identifying a count of the distinct input fields in the form;
   (d) ascertaining by the processor of the client device that the determined total number equals a specified total number of distinct input fields provided in user credentials stored in the memory;
   (e) identifying by the processor of the client device a submit element in the form;
   (f) attempting login at a website corresponding to the web artifact by supplying by the processor of the client device the user credentials stored in the memory to the web artifact.

2. The method of claim 1, wherein the web artifact comprises at least one of a web page and a web application.

3. The method of claim 1, wherein the structure comprises a document object model (DOM) of the web artifact.

4. The method of claim 1, wherein an event from the one or more events comprises a JavaScript event.

5. The method of claim 1, wherein identifying one or more input fields comprises identifying an input field of at least one of: (i) an unspecified type, (ii) a text type, and (iii) an email type.

6. The method of claim 1, wherein identifying the submit element comprises identifying at least one of an input field, an element of type button, an element associated with an onClickevent, and a link.

7. The method of claim 1, wherein:
   the web artifact comprises a webpage;
   the model comprises a plurality of iframes associated with the webpage; and
   identifying a password field in the model in step (b) comprises identifying a password field in at least one iframe.

8. The method of claim 1, further comprising executing by the processor of the client device at least one click on a non-login artifact to retrieve the web artifact.

9. The method of claim 1, further comprising generating a login script by outputting by the processor of the client device:
   one or more first commands, each first command corresponding to a different one of the identified input fields;
   a second command corresponding to the password field; and
   a third command corresponding to the submit element.

10. The method of claim 9, wherein each one of the first commands and the second command comprises at least a portion of user credentials stored in the memory.

11. The method of claim 10, wherein the user credentials comprise a user name and a corresponding password.

12. The method of claim 1, further comprising:
   verifying the attempted login at the web artifact using a first non-login artifact received in response to the supplied user credentials.

13. The method of claim 12, wherein verifying the attempted login comprises:
   storing in the memory an access handle to the first non-login artifact; and
   testing if the first non-login artifact comprises a sign-out element.

14. The method of claim 13, wherein the access handle comprises a uniform resource locator (URL).

15. The method of claim 13, wherein the sign-out element comprises at least one of a field, a button, and a link, and the sign-out element is associated with a string selected from the group consisting of: "signout," "sign out," "logout," "log out," "my profile," "your profile," "edit profile," "my account," "your account," "edit account," "my settings," "your settings," "edit settings," and "account settings".

16. The method of claim 13, further comprising:
   seeking by the processor of the client device access to the stored access handle and, in response, receiving a second non-login artifact; and
   testing by the processor of the client device that the second non-login artifact lacks any sign out elements.

17. The method of claim 16, further comprising generating a verification script by outputting by the processor of the client device:
   a command to seek the stored access handle; and
   at least one command testing a lack of a particular sign-out element.

18. A system for determining a login sequence, comprising:
   a memory comprising a model of a web artifact transmitted by a server at a website associated with the web artifact, the model comprising at least one of: (i) a structure of the web artifact, and (ii) one or more events associated with an element of the structure; and
   a processor different from the server coupled to the memory and configured to:
     identify a password field in the model, and a form associated with the password field, the form comprising a set of distinct input fields, each distinct input field having a respective type selected from a group consisting of: (i) an unspecified type, (ii) a text type, and (iii) an email type, one field in the set being the identified password field;
     determine a total number of distinct input fields in the form: the determined total number identifying a count of the distinct input fields in the form;
     ascertain that the determined total number equals a specified total number of distinct input fields provided in user credentials stored in the memory;
     identify a submit element in the form; and
     attempt login at the website corresponding to the web artifact by supplying user credentials stored in the memory to the web artifact.

19. The system of claim 18, wherein the processor is further configured to:
   generate one or more first commands, each first command corresponding to a different one of the identified input fields;
   generate a second command corresponding to the password field;

generate a third command corresponding to the submit element; and output a login script comprising the one or more first commands, the second command, and the third command.

20. The system of claim 18, wherein the processor is further configured to:

verify the web artifact using a first non-login artifact received in response to the supplied user credentials; and output a verification script if the verification is successful.

* * * * *